US007595958B2

(12) United States Patent
Partee (10) Patent No.: US 7,595,958 B2
(45) Date of Patent: Sep. 29, 2009

(54) SYSTEM INCLUDING A HARD DISK DRIVE AND STRAY MAGNETIC FIELD SENSOR AND ASSOCIATED METHOD

(76) Inventor: Charles Partee, P.O. Box 218, 952 Steamboat Valley Rd., Lyons, CO (US) 80540

( * ) Notice: Subject to any disclaimer, the term of this patent is extended or adjusted under 35 U.S.C. 154(b) by 401 days.

(21) Appl. No.: 11/327,765

(22) Filed: Jan. 6, 2006

(65) Prior Publication Data
US 2008/0130165 A1    Jun. 5, 2008

(51) Int. Cl.
*G11B 33/14* (2006.01)
*G11B 27/36* (2006.01)
*G11B 15/04* (2006.01)
*G11B 21/02* (2006.01)

(52) U.S. Cl. .................. 360/97.02; 360/75; 360/60; 360/31

(58) Field of Classification Search .................. None
See application file for complete search history.

(56) References Cited

U.S. PATENT DOCUMENTS 5,825,179 A * 10/1998 Sherman et al. ............. 324/210

6,738,216 B2 * 5/2004 Kawana et al. ................ 360/75
7,289,284 B2 * 10/2007 Arai et al. .................... 360/25
2002/0034029 A1 * 3/2002 Aoyagi et al. ................ 360/31
2007/0025013 A1 * 2/2007 Li et al. .................... 360/97.01

OTHER PUBLICATIONS

Feng et al, Effects of Uniform Magnetic Fields on Shielded MR Sensors, Nov. 1991, IEEE Transactions on Magnetics, vol. 27, No. 6, pp. 4701-4703.
Smith, Stray Field Response of Shielded Magnetoresistive Recording Heads, Aug. 1989, IBM Corporation Publication.

* cited by examiner

*Primary Examiner*—K. Wong
(74) *Attorney, Agent, or Firm*—Workman Nydegger (57) ABSTRACT

A system includes a host device and a disk drive interfaced with the host device are described as well as an associated method. The disk drive includes a magnetic media for storing information using an actuator arrangement to perform a data access by moving at least one head proximate to the magnetic media. The information may be subject to corruption when the disk drive is exposed, during the data access, to a given stray magnetic field having a given minimum magnetic field intensity. The given stray magnetic field will not corrupt the information on the magnetic media with the actuator arrangement positioned away from the magnetic media. A stray magnetic field protection arrangement is configured for detecting an ambient magnetic environment for use in causing the actuator arrangement to park responsive to the detection of at least the given minimum magnetic field intensity.

27 Claims, 3 Drawing Sheets

SYSTEM INCLUDING A HARD DISK DRIVE AND STRAY MAGNETIC FIELD SENSOR AND ASSOCIATED METHOD

BACKGROUND

Hard disk drives, as well as other forms of storage devices, which store information in magnetic form, are susceptible to external magnetic fields. Accordingly, subjecting a hard disk drive, or other such device using magnetic based storage, to an externally generated magnetic field can produce defects that prevent a user from retrieving data therefrom. Although the following discussion may be adapted for use with other forms of storage devices, it is framed in terms of a hard disk drive in order to clearly illustrate the various concepts that have been brought to light herein.

Thus, there are limitations in the prior art with respect to the operation of a hard disk drive that may be subject to exposure to stray magnetic fields.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

A system and associated method are described for use in protecting a disk drive from a hostile magnetic environment. The system includes a host device. A disk drive is interfaced with the host device and includes a magnetic media for storing information, and which information is accessed using an actuator arrangement for performing a data access by moving at least one head proximate to the magnetic media. The information may be subject to corruption when the disk drive is exposed, during the data access, to a given stray magnetic field having a given minimum magnetic field intensity, which given stray magnetic field is generated external to the system. A stray magnetic field protection arrangement is configured for detecting an ambient magnetic environment to which the disk drive is exposed and, responsive thereto, for causing the actuator arrangement to park responsive to the detection of at least the given minimum magnetic field intensity.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology has been adopted for purposes of enhancing the reader's understanding, with respect to the various views provided in the figures, and is in no way intended as being limiting.

Figure 1:
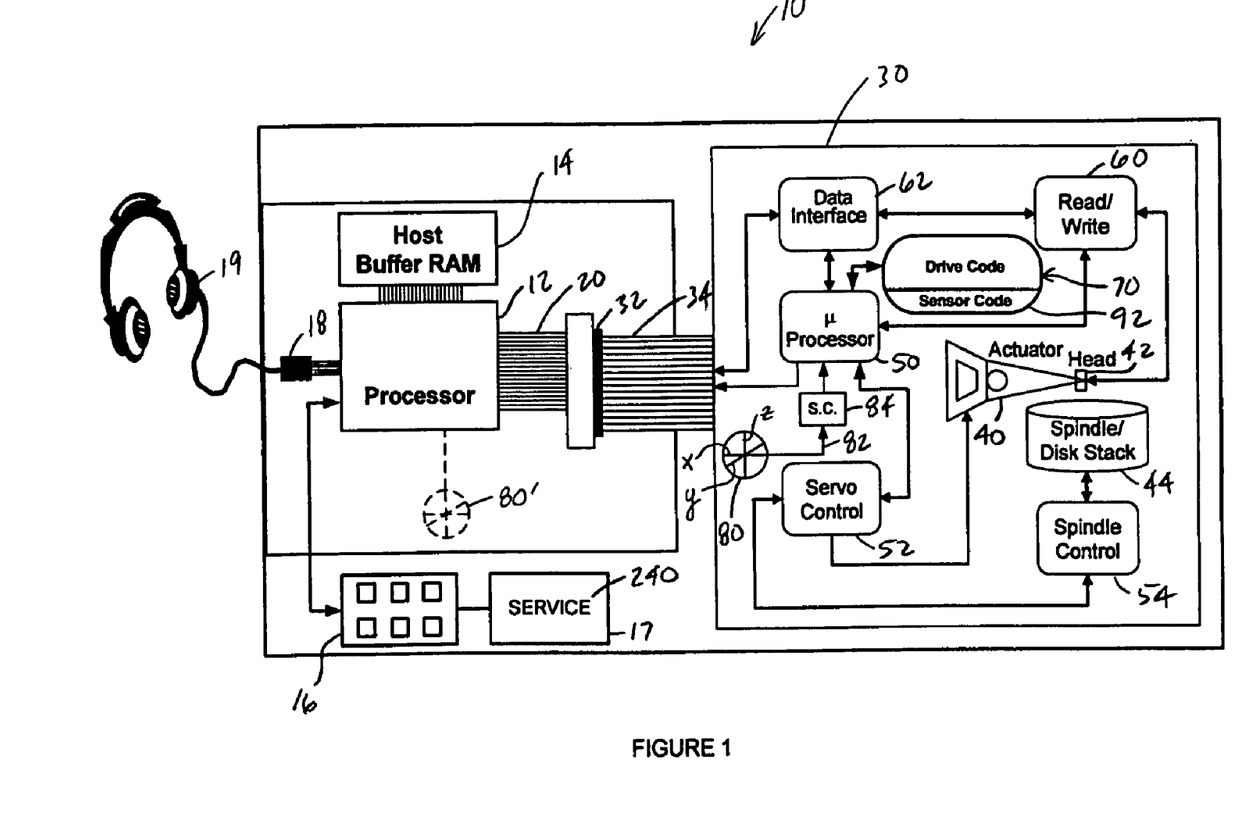
FIG. 1 is a block diagram of a host device and hard drive that is housed in the host device, shown here to illustrate the use of a stray field or external magnetic field sensor.

Turning now to the drawings, wherein like components are indicated by like reference numbers throughout the various figures, attention is immediately directed to FIG. 1, which is a block diagram illustrating an electronic host device, generally indicated by the reference number 10, manufactured in accordance with the present invention. It is to be understood that device 10 is intended to be representative of any number of digitally implemented device types including, but not limited to wireless telephones, internet appliances, personal digital assistants, music players, multi-function pagers, multimedia devices or any other device adaptable to use with an electromechanical digital storage device. The present invention is well suited for use in devices which may, at times, be subjected to use in a "hostile" magnetic environment. Applicant recognizes that portable devices, in particular, can commonly be exposed to such an environment. Such exposure can occur, for example, by placing the portable device into a pouch with a magnetic closure mechanism, exposing the device to magnetic-based security devices, placing the device near magnets, magnetized tools, motors, or electronics, such as a CRT or current-carrying wires, or other environments wherein a magnetic field is found.

The present disclosure, however, is in no way limited to use in portable devices. Further, the teachings herein find application where any appropriate storage device may be subjected, at least briefly, to stray external magnetic fields.

Continuing with a description of FIG. 1, host device 10 includes a processing arrangement 12 configured for operating the overall device. A host memory section 14 is associated with processing arrangement 10 which may be, for example, a suitable form of RAM. Alternatively, the memory section can be made up of a suitable combination of ROM and RAM wherein a volatile RAM portion of the memory section is loaded for device operation during an initial boot-up.

With continuing reference to FIG. 1, device 10 further comprises a user interface arrangement, for example, in the form of a keypad 16, a display 17 and a headset connector 18 that is connected to an external headset 19. Other items include an interface 20 that may be configured in accordance with a number of well-known interface arrangements such as, for example, compact flash, IDE or any other suitable interface that is currently in use or yet to be developed.

A hard drive 30 is housed within host device 10 and includes a connector arrangement 32 that is electrically connected to interface 20, for example, using a flexible connector, as shown having a connection end 34, or any other suitable connection scheme. Hard drive 30 may be of any suitable configuration based, at least in part on considerations with respect to host device 10. In one implementation, for a portable device, a miniature hard drive such as the CORNICE® Storage Element may be used, although it is to be understood that a hard drive having any suitable form factor may be utilized. Hard drive 30 may be removably received, for example, in a compact flash implementation or mounted as permanent internal storage.

Continuing to refer to FIG. 1, hard disk drive 30 includes a number of functional elements that will be familiar to one having ordinary skill in the art. Among these elements are an actuator 40 configured for selectively moving a transducer arrangement or "head" 42 which accesses a disk arrangement 44. The drive may include any suitable number of disks and heads wherein one or both sides of each disk can be used for data storage purposes. Head 42 is configured to cooperate with the rotation of an associated disk, in disk arrangement 44, so as to "fly" above the surface of the disk, in a well-known manner. A microprocessor 50 is used to control a servo section 52 that is itself configured for controlling disk arrangement 44, using a spindle control section 54, and for controlling actuator 40. Disk data is handled under control of microprocessor 50 using a read/write channel 60 in cooperation with a data interface 62. A memory section 70 contains code for use by microprocessor 50 in operating the overall drive, as will be described in further detail hereinafter.

With the general structure of hard drive 30 in mind, Applicant has recognized a particular phenomenon that appears to occur when drive 30 is exposed to an external magnetic field in a given range of magnetic field strength. While not intending to be bound by theory, it is thought that, in this given range, the shielding and/or write structures in magnetic read/write heads 42 can become magnetized by the stray field, and focus the now concentrated stray field onto the disk, when the heads are accessing the disk (i.e., the heads are loaded). If the stray field is strong enough, as represented by this given range of magnetic field strength, the focused or resulting field from the magnetized structures can demagnetize the data already written on the disk, including critical servo data. In this case, certain data on the disk will become damaged and lost due to magnetic erasure from the stray magnetic field. Since all disk drives use similar head technology, it is thought that all disk drives may be relatively similar in sensitivity to such stray magnetic fields and this now recognized mechanism of data loss. Hence, this given range may be referred to hereinafter as a focusing effect range (FER). In this regard, when a magnetic field exceeding a lower limit of the field effect range is detected at the hard disk drive during operation, it is generally safer to remove the head from the disk surface and park it at least until the magnetic field has reduced to a value that is below the focusing effect range. Applicant believes that the focusing effect described above is significant. That is, the given range in which data damage occurs, responsive to the aforedescribed focusing effect, is believed to be significantly lower than a stray magnetic field strength that would produce data loss even with the head in a parked position. Thus, a margin of safety is afforded by parking the actuator arm and heads whenever the stray field strength crosses the lower threshold limit of the focusing effect range such that data loss and corruption is avoided when the stray field remains at a signal strength that is within the focusing effect range.

In view of the foregoing, and having generally described host device 10 including hard drive 30, housed therein, additional features of the illustrated system include a magnetic sensor 80 that is incorporated into hard disk drive 30, in the present example. A sensor electrical connection 82 is routed to a signal conditioning section 84 and, in turn, to microprocessor 50. It should be appreciated that signal conditioning section 84 may be optional depending upon the configuration of magnetic sensor 80. The latter, in the present example, is a tri-axial sensor or orthogonal arrangement of single axis sensors for sensing along axes x, y and z, so that the ambient magnetic environment can be detected irrespective of its specific orientation in relation to the sensor. Further, the orientation of the ambient stray field can also be determined. It is noted sensors or sensor arrangements capable of sensing along two orthogonal axes or even a single axis can be used, depending, for example, on the desired level of protection and anticipated characteristics of the ambient stray field. Depending on the application, it is possible to make certain pragmatic assumptions about the rate of change of magnetic field that the device is likely to experience. The magnetic field sensor signal should be sampled rapidly enough to avoid damage due to a potentially immediately applied magnetic field. It is generally considered that sampling every 10 ms is adequate for typical applications in portable devices, but slower or faster sampling rates are possible depending on the application. Sensor 80 may be of any suitable type that is responsive to magnetic fields. Such sensors include, but are not limited to Hall effect sensors, magnetoresistive, giant magnetoresistive (GMR), and tunneling junction magnetoresistive sensors, magneto-inductive sensors, magneto-impedance sensors, magneto-optic sensors (Faraday, Kerr effects), search coil, flux-gate magnetometers, Superconducting Quantum Interference Devices (SQUID), spin-resonance magnetometers, magneto-biological sensors, such as alignment of magnetotactic bacteria, photon precession sensors, or nuclear precession (Overhauser effect) sensors, as well as others. More specifically, a Hall effect sensor such as the AD22151 from Analog Devices could be used for single-axis sensing.

It is noted that some sensors, such as, for example, Hall effect and magnetoresistive sensors, are uniaxially oriented devices that are sensitive to a single component of the applied magnetic field vector. Since, in general, the applied field can have any vector orientation, an array of these sensors can be oriented orthogonally to each other in order to measure the orientation of the field, as well as its total vector magnitude.

With continuing reference to FIG. 1, operation of hard drive 30 proceeds based on control code that is stored in memory section 70. The latter includes drive code 90, which is used to control the overall functionality of hard drive 30 including coordinating motion of actuator 40 with rotation of disk arrangement 44 by servo section 52, and sensor code 92 for use in monitoring magnetic sensor 80. Execution of sensor code 92 may occur periodically within the framework of an overall routine which includes executing drive code 90. Of course, the speed of microprocessor 50 may, at least in part, establish how often the sensor code can be executed. As noted above, it is contemplated that the sensor code may be executed at least every 10 ms. In this way, sensor output events having durations on the order of 20 ms or more are readily detectable.

Figure 2:
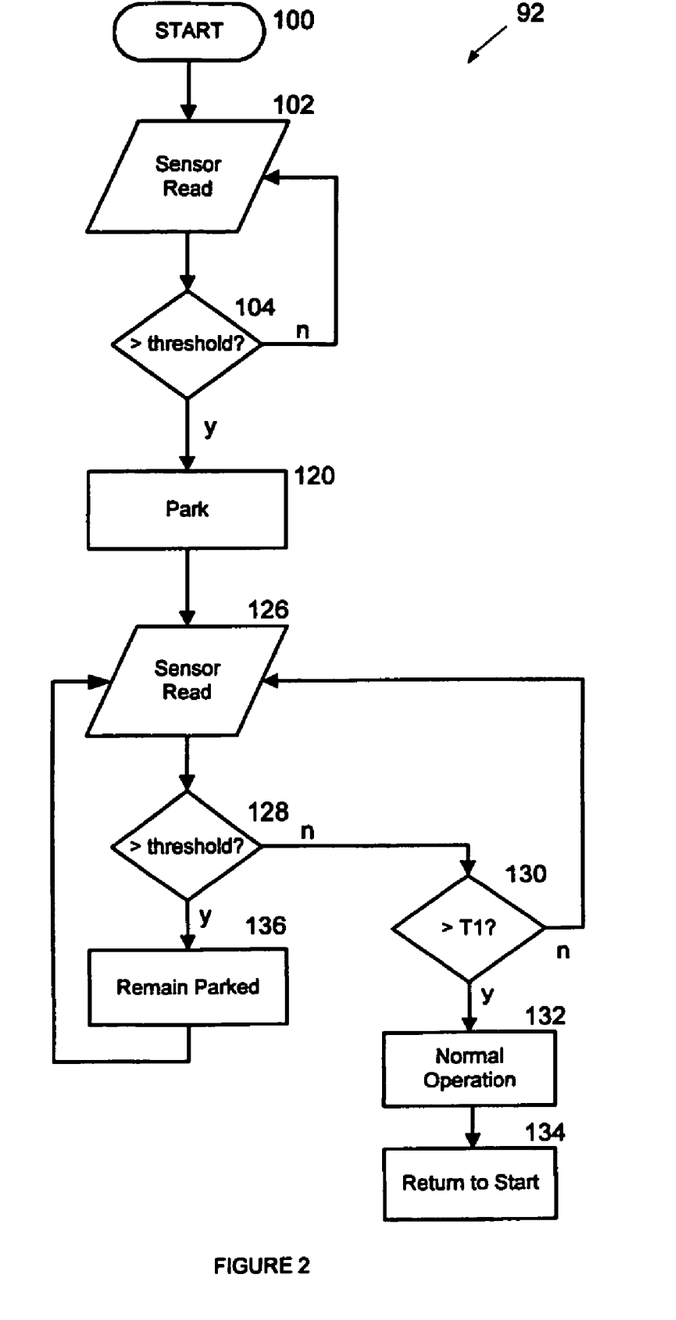
FIG. 2 is a flow diagram showing one embodiment of a technique for monitoring the magnetic sensor that is illustrated in FIG. 1.

Referring to FIG. 2 in conjunction with FIG. 1, specific details with respect to one embodiment of sensor code 92 will now be provided. The sensor code is entered at a start step 100 following which a sensor output 102 is established. Step 104 then determines whether the sensor output value is greater than a predetermined threshold value that is selected as will be described below to establish whether the stray magnetic field strength is greater than a predetermined threshold value at a particular orientation (which may include any orientation). In this regard, a multi-axial sensor or orthogonal sensor arrangement will detect an incident stray field irrespective of its particular orientation. It is noted that the predetermined threshold should be equal to or less than the lower limit of the focusing effect range. When this condition is detected, step 120 is then initiated so as to immediately park or retract actuator 40 and its associated head 42 or heads. For a hard drive which utilizes an active latching arrangement, any appropriate activities may be performed that are necessary for latching the actuator in its parked position. Further, in order to minimize disruption of ongoing operations, any current data access is paused until such time that normal operations resume. Such a pause is available in data communication protocols over interfaces commonly used for hard disk drives (such as ATA, SCSI, CE-ATA, MMC-ATA) all include standard features which allow data transfer on the interface to be temporarily paused for mechanical related activities such as seeking, retries, error recovery and the like. An indication of the sensor status to the host device can be provided on a sensor status line 124 that is dedicated for that purpose. Further, the host device or the hard drive can support a function wherein a message is visually displayed or otherwise communicated, perhaps audibly, to the user to remove the device from the magnetic field. Any suitable number of such sensor status lines can be used to indicate to the host device a particular one of a number of possible conditions associated with a sensor. The use of one or more dedicated sensor status lines may be advantageous if the triggering event causes drive processor 50 to enter a wait condition such that the drive processor may not otherwise notify the host processor as to the cause of the current pause or wait status. Further, it should be appreciated that the number of sensor status lines can be limited, for example, by multiplexing sensor status information thereon.

It is of note that detecting a mere return of the sensor output to a detected magnetic field strength, that is below the focusing effect range, may be a momentary event. That is, the stray external magnetic field may be varying and have passed through a zero or reduced magnitude phase. Accordingly, step 126 again reads sensor 80, subsequent to the parking operation. At this point, it is generally desirable that actuator 40 remain parked, so long as the sensor continues to exhibit an output that is greater than the predetermined threshold. In consideration of time-varying magnetic fields, step 128 again compares the sensor output to the predetermined threshold and, upon detecting a value that is less than the predetermined threshold, routes operation to a step 130. In this case, the duration of the inactive interval is monitored from this point and compared with an interval T1. So long as the sensor output remains below the threshold, a loop comprising steps 126 128 and 130 is executed until the sensor output has been below the predetermined threshold for a time period that is greater than T1. The value that is selected for T1 will depend on the type of device as well as the environment that it is expected to occupy in use. For the purposes of illustration, but not by way of limitation, T1 could be between 50 ms and 1 second, as well as shorter or longer times if desirable. Responsive the sensor remaining sufficiently low for at least T1, step 130 then causes step 132 to resume normal operation of the drive followed by a return to start 100 in step 134. In restarting normal data access operations using hard drive 30, actuator 40 is allowed to access disk arrangement 44 and any data accesses that were paused, responsive to a triggering event, are resumed and completed. On the other hand, at any time step 128 establishes that the sensor output is greater than the predetermined threshold, step 136 then causes the actuator to remain parked and steps 126, 128 and 136 form a loop until the sensor output drops below the predetermined threshold.

Another method for protecting against time-varying magnetic fields is to record and analyze the magnetic field over time. By fitting the measured values to a variety of probable curves (sinusoidal, linear, square wave, exponential, logarithmic), it is possible to predict the future value of the external magnetic field at any given time. The drive can then anticipate that the threshold may shortly be exceeded again and remain in the parked state.

With respect to the selection of the predetermined threshold or other thresholds yet to be described, it should be appreciated that, if the external field is very weak, it will cause no significant degradation to magnetically stored information in the drive. Fields produced by a disk drive motor itself are in this category. This level of magnetic field strength will be referred to as having an upper intensity value of M1.

If the field is of greater magnitude than M1, then there might only be a temporary degradation in performance, such as reduced data transfer rate because of errors and retries in reading the data from the disk. In this case, the performance degradation will be alleviated once the stray field reduces. In other words, there is no permanent damage to the disk drive or data stored therein such that these errors may be termed as "soft errors." This level of stray magnetic field strength will be referred to as occurring in a range having a lower limit of M1 and having an upper limit of M2. Accordingly, only soft errors should occur in the range that is between M1 and M2. Hence, this range may be referred to as a "soft error" range.

For still higher fields above M2, the disk drive may experience severe difficulty in reading data from the disk (or severe difficulty in writing to the disk, if a write operation is requested by a host device)—severe to the point where the read and/or write operations may fail and result in errors reported to the host. In this moderate case, the errors/problems will also be alleviated once the stray field reduces. Again, there is generally no permanent damage to the disk drive. In this same case, however, is also possible that the servo information stored on the disk and which is read used for use in tracking so as to provide controlled movement of the transducer(s) or head(s) which access the storage media, will also be difficult to read accurately. In this case, the drive control circuitry can lose control of the head position, allowing the control system to seek rapidly and in an uncontrolled manner by moving the heads back and forth across the disk. In an effort to recalibrate the servo, the control circuitry may cause the heads to repeatedly load onto and unload off the disk, for example, to and from a ramp that is located adjacent to the rotating disk. Both the rapid uncontrolled seeks and the frequent load/unload commands have the potential to cause damage to the drive. Accordingly, it is desirous to avoid this mode of operation. Therefore, attempting to perform a read operation in this magnetic environment could pose a risk in creating what are termed to be "hard errors." This level of field strength will be indicted as having an upper limit of M3 such that a range from M2 to M3 characterizes this behavior.

In even higher fields (i.e., above M3), the disk drive will continue to experience severe difficulty in reading data from the disk (or severe difficulty in writing to the disk if a write operation is requested by the host) severe to the point where the read or write operations will fail and result in errors reported to the host. In this case, while these operations are being attempted, certain data on the disk will become damaged and lost due to magnetic erasure as a result of the aforedescribed focusing effect. The damaged data can be "user data" in the sense of data sectors normally written/read by the host system, but the damaged data can also be the highly critical servo data. Loss of the servo data can result in catastrophic failure of the disk drive. Loss of enough user data can also result in catastrophic failure of the host system. In this severe case, the damage is permanent and the functional problems will persist even after the stray field reduces. In addition, the magnetic field can cause changes in the speed of the motor rotation, which can lead to sudden reductions in the flying height of the head. This reduction can cause the head to come into contact with the disk, which often produces a data loss or even a catastrophic failure of the drive. This level of field strength is designated as having an upper limit of M4 such that a range from M3 to M4 characterizes this behavior.

In cases with extremely high fields, above M4, the field itself is so high that certain data on the disk will become damaged and lost due to magnetic erasure by the stray magnetic field itself, even if the drive is not in operation. In addition, it is known that these fields can hasten the thermal decay of the data stored on the drive. The damaged data could be "user data" in the sense of data sectors normally written/read by the host system, but the damaged data could also be the highly critical servo data. Loss of the servo data could result in catastrophic failure of the disk drive. Loss of enough user data could also result in catastrophic failure of the host system. In this severe case, the damage is permanent and the functional problems will persist even after the stray field reduces. In this case, if the heads are already parked, an additional action can include informing the user to remove the drive from the field.

It should also be appreciated that the orientation of the magnetic field is a concern. For example, while not intending to be bound by theory, it is thought that, in the field focusing effect regime, an applied field oriented perpendicular to the plane of the disk is more likely to be focused in a deleterious way than is a field oriented in the plane of the disk. Similarly, while not intending to be bound by theory, it is expected that, for longitudinal recording, an applied, stray field oriented in the plane of the disk is more likely to be deleterious than one oriented perpendicular to the disk. Conversely, for perpendicular recording, an applied, stray field oriented perpendicular to the disk is more likely to be deleterious than one oriented in the plane of the disk. Thus, reflexive actions and user notifications may also be based no only on the intensity of a stray field, but its orientation in conjunction with the intensity.

It should be specifically understood and appreciated that every device that is sensitive to external fields will have its own distinct levels of protection required. The recommended method for determining these levels is experimentation with the actual device in its host environment as well as theoretical considerations such as, in the hard drive case, the disk coercivity. In one embodiment, a 3D Helmholz coil arrangement, capable of achieving 3000 Oe fields in any direction, could be used to determine the various thresholds at which damage begins. In another embodiment, a strong permanent magnet could be brought into proximity of the device and the fields and orientation determined by measurement.

For the example of a hard drive, it should also be appreciated that each head and media design, as well as new methods of recording the information (e.g. perpendicular recording vs. longitudinal recording) will change the sensitivity of any given device. For example, it has been observed in the past that perpendicular recording heads are particularly sensitive to external magnetic fields.

By of example, suitable limits for a particular hard drive such as the CORNICE™ 4.0 G drive, may be set as described in Table 1.

TABLE 1

Threshold Magnetic Field Limits

| Threshold | Magnitude | Orientation |
|---|---|---|
| M1 | 10 Oe | Any |
| M2 | 100 Oe | Any |
| M3 | 300 Oe | Any |
| M4 | 3500 Oe | Any |

It should be appreciated that this Table 1 could set forth different values for different orientations. For purposes of margin of error for a portable device wherein the orientation of the device may change abruptly, however, the thresholds can be defined without respect to orientation.

Figure 3:
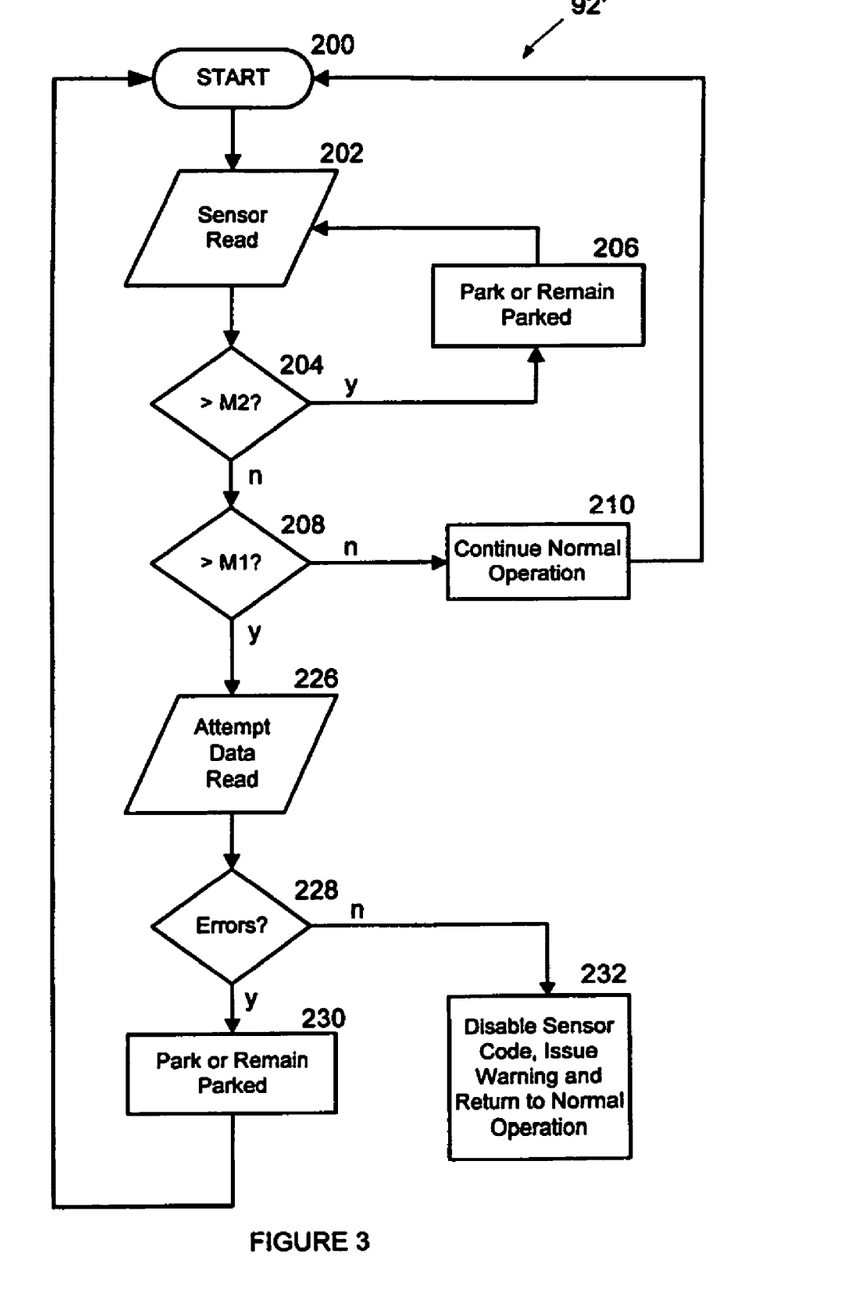
FIG. 3 is a flow diagram showing another embodiment of a technique for monitoring the magnetic sensor that is illustrated in FIG. 1.

Based on the various levels of stray magnetic field strength, described immediately above, another embodiment of sensor code is illustrated in FIG. 3, generally indicated by the reference number 92'. This code begins at start 200 and, thereafter, performs a sensor read at 202. Step 204 then compares the obtained sensor reading to threshold M2, above which hard errors are potentially created. If the value is greater than M2, step 206 causes the drive actuator to park or remain parked. A new sensor reading is then obtained by repeating step 202. On the other hand, if the value obtained in step 202 is less than M2, step 208 compares the reading with threshold M1. In this regard, soft errors occur between threshold M1 and threshold M2. Accordingly, if the sensor reading is below M1, normal operation continues at step 210 and, thereafter, returns to start 200.

One concern resides in the possibility that magnetic sensor 80 could be defective by continuously, falsely indicating an external magnetic field state. Accordingly, if the sensor reading is greater than M1, step 226 uses the actuator to attempt a data read from the disk. At 228, a decision is made based on whether errors occurred during the attempted data read. If one or more errors were detected, step 230 parks the actuator or causes the actuator to remain parked and then refers operation to start 200. If no errors were detected at 228, it is assumed that the magnetic sensor is defective and step 232 causes the sensor code to be disabled and may issue a warning 240 to the user on display 17 of FIG. 1 to have the device serviced. Normal operation can then resume without monitoring the magnetic sensor. In this way, host device functionality can be maintained, although at the expense of reduced protection from external magnetic field events. This testing operation is not performed with respect to exceeding threshold M2, due to the possibility that the device is indeed in a continuous magnetic field and risk of operation while the magnitude of the field exceeds M2 may be unacceptable. In this regard, the host device may issue a different warning on display 17 to the user, for example, warning the user to remove the device from the external magnetic field.

Referring briefly to FIG. 1, while magnetic sensor 80 is illustrated as forming part of hard disk drive 30, it should be appreciated that this is not a requirement. For example, the magnetic sensor can be installed in the host device, as shown in phantom and indicated by the reference number 80'. In this instance, the sensor code can be executed by either host processor 12 or drive processor 50. U.S. patent application Ser. No. 11/327,569 entitled HARD DISK DRIVE WITH EXTERNAL SENSOR INTERFACE, SYSTEM FOR USE THEREOF AND METHOD, filed contemporaneously herewith and incorporated herein by reference in its entirety, illustrates the use of a magnetic sensor that is installed in the host device.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system, comprising:
   a host device;
   a disk drive interfaced with said host device and including a magnetic medium for storing information using an actuator arrangement for performing a data access by moving at least one head proximate to the magnetic medium and which information may be subject to corruption when the disk drive is exposed, during said data access, to a stray magnetic field having a first threshold magnetic field intensity, which stray magnetic field is generated external to the system; and
   a stray magnetic field protection arrangement supported by at least a selected one of the disk drive and the host device, the stray magnetic field protection arrangement configured for detecting the stray magnetic field to which said disk drive is exposed, wherein the stray magnetic field protection arrangement causes the actuator arrangement to park responsive to the detection of the stray magnetic field having at least the first threshold magnetic field intensity and wherein the stray magnetic field protection arrangement causes the actuator arrangement to remain parked following detection of the stray magnetic field having the first threshold magnetic field intensity so long as at least one of (a) the stray magnetic field is greater than a second threshold magnetic field intensity that is less than the first threshold magnetic field intensity and (b) a read operation attempted when the stray magnetic field is between the first and second threshold magnetic field intensities results in an error.

2. The system of claim 1 wherein said stray magnetic field protection arrangement is configured for maintaining the actuator arrangement in a parked position so long as the first threshold magnetic field intensity is detected.

3. The system of claim 1 wherein said first threshold magnetic field intensity is approximately 100 Oe.

4. The system of claim 1 wherein the stray magnetic field protection arrangement forms a portion of said disk drive.

5. The system of claim 1 wherein the stray magnetic field protection arrangement includes a magnetic field sensor that is located in the host device.

6. The system of claim 1 wherein said stray magnetic field protection arrangement includes a magnetic field sensor that is located in said disk drive.

7. The system of claim 1 wherein said stray magnetic field protection arrangement includes a magnetic sensor that is selected from the group consisting of Hall effect sensors, magnetoresistive, magneto-impedance sensors, magneto-optic sensors, search coil, flux-gate magnetometers, Superconducting Quantum Interference Devices, spin-resonance magnetometers, magneto-biological sensors, photon precession sensors and nuclear precession sensors.

8. The system of claim 1 wherein said stray magnetic field protection arrangement includes a sensor arrangement having a tri-axial response.

9. The system of claim 1 wherein exposure of said disk drive to a range of stray magnetic field strength, having said second threshold magnetic field intensity as a lower limit thereof and extending upward to said first threshold magnetic field intensity as an upper limit, induces an operational instability in the operation of said disk drive during said disk access generally without producing corruption of said information that is stored on the disk and wherein said stray magnetic field protection arrangement is configured to initiate a read data access, responsive to detecting said stray magnetic field as being within said range, for use in providing a status indication relating to said magnetic field sensor.

10. The system of claim 9 wherein said stray magnetic field detection arrangement is configured for confirming operation of said magnetic field sensor based on detecting at least one read error in association with said read data access.

11. The system of claim 9 wherein said stray magnetic field detection arrangement is configured for disabling said magnetic field sensor based on an absence of read errors in association with said read data access.

12. In a system including a host device and a disk drive interfaced with the host device, said disk drive including a magnetic medium for storing information using an actuator arrangement for performing a data access by moving at least one head proximate to the magnetic medium and for otherwise moving the head to a parked position, a method comprising:
    determining a first minimum stray magnetic field intensity of a stray magnetic field that is generated external to the system which can cause corruption of said information when the disk drive is exposed thereto during said data access;
    parking the actuator arrangement at said parked position if an intensity of the detected stray magnetic field in the ambient magnetic environment is equal to or greater than said first minimum stray magnetic field intensity; and
    maintaining the actuator arrangement at said parked position following detection of the stray magnetic field greater than said first minimum stray magnetic field intensity so long as at least one of (a) the stray magnetic field is greater than a second minimum stray magnetic field intensity less than the first minimum stray magnetic field intensity and (b) a read operation attempted when the stray magnetic field is between the first and second minimum stray magnetic field intensities results in an error.

13. The method of claim 12 including maintaining the actuator arrangement at said parked position so long as the detected intensity of the ambient magnetic environment is greater than the first minimum stray magnetic field intensity.

14. The method of claim 12 wherein said first minimum magnetic field intensity is approximately 100 Oe.

15. The method of claim 12 including locating a magnetic field sensor in the host device as part of a stray magnetic field detection arrangement used in detecting the stray magnetic field.

16. The method of claim 12 including locating a magnetic field sensor in the disk drive as part of a stray magnetic field detection arrangement.

17. The method of claim 12 wherein exposure of said disk drive to a range of stray magnetic field strength, having said second minimum magnetic field intensity as a lower limit thereof and extending upward to said first minimum magnetic field intensity as an upper limit, induces an operational instability in the operation of said disk drive during said disk access generally without producing corruption of said information that is stored on the disk and wherein said method includes causing said stray magnetic field protection arrangement to initiate a read data access, responsive to detecting said stray magnetic field as being within said given range, for use in providing a status indication relating to a magnetic field sensor.

18. The method of claim 17 including confirming operation of said magnetic field sensor based on detecting at least one read error in association with said read data access.

19. The method of claim 17 including configuring said stray magnetic field detection arrangement to disable said magnetic field sensor based on an absence of read errors in association with said read data access.

20. The method of claim 12 including selecting said first minimum stray magnetic field intensity as characterizing a lower limit of a range of ambient magnetic field strength which induces operational errors associated with said data access.

21. A device, comprising:
a data storage medium configured to store data that is susceptible to corruption from an ambient magnetic field;
a head configured to read the data from the data storage medium;
means for detecting an intensity of the ambient magnetic field, wherein the head is configured to be parked while the intensity of the ambient magnetic field remains above a first threshold intensity;
wherein the head is further configured to be parked if the means for detecting an intensity of the ambient magnetic field detects the intensity of the ambient magnetic field as being greater than a second threshold intensity that is less than the first threshold intensity.

22. The device of claim 21, further comprising a processor that that identifies whether the means for detecting an intensity of at least one orientation of the ambient magnetic field is malfunctioning based on an access of the data storage medium while the intensity is between the first threshold intensity and the second threshold intensity.

23. The device of claim 22 wherein an absence of errors in the access of the data storage while the intensity is between the first intensity and the second intensity indicates a malfunction of the means for detecting an intensity of the magnetic field.

24. The device of claim 23 wherein the means for detecting an intensity of the ambient magnetic field is disabled when the malfunction is indicated.

25. The device of claim 21, further comprising an actuator, the actuator supporting the head, the actuator moveable between an unparked position and a parked position and wherein the data medium storage is more susceptible to corruption from stray magnetic fields when the actuator is in the unparked position than when the actuator is in the parked position.

26. A system, comprising:
a host device;
a disk drive interfaced with said host device and including a magnetic medium for storing information using an actuator arrangement for performing a data access by moving at least one head proximate to the magnetic medium and which information may be subject to corruption when the disk drive is exposed, during said data access, to a stray magnetic field having a first threshold magnetic field intensity, which stray magnetic field is generated external to the system; and
a stray magnetic field protection arrangement supported by at least a selected one of the disk drive and the host device, the stray magnetic field protection arrangement configured for detecting the stray magnetic field to which said disk drive is exposed, wherein the stray magnetic field protection arrangement is further configured to fit measurements of the stray magnetic field to a curve and to cause the actuator arrangement to park prior to a time at which the curve predicts the stray magnetic field exceeding the first threshold magnetic field intensity.

27. The system of claim 25, wherein the curve is at least one of sinusoidal, linear, square wave, exponential, and logarithmic.

* * * * *

UNITED STATES PATENT AND TRADEMARK OFFICE
CERTIFICATE OF CORRECTION

PATENT NO.        : 7,595,958 B2
APPLICATION NO.   : 11/327765
DATED             : September 29, 2009
INVENTOR(S)       : Partee

Page 1 of 1

It is certified that error appears in the above-identified patent and that said Letters Patent is hereby corrected as shown below:

Column 11
Line 32, delete "that that" and insert --that--

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,595,958 B2
APPLICATION NO. : 11/327765
DATED            : September 29, 2009
INVENTOR(S)      : Charles Partee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this

Twenty-eighth Day of September, 2010

David J. Kappos
*Director of the United States Patent and Trademark Office*